United States Patent [19]
Luckevich

[11] Patent Number: 5,551,769
[45] Date of Patent: Sep. 3, 1996

[54] METHOD AND SYSTEM FOR SPLIT MU CONTROL FOR ANTI-LOCK BRAKE SYSTEMS

[75] Inventor: Mark S. Luckevich, Ann Arbor, Mich.

[73] Assignee: Kelsey-Hayes Company, Livonia, Mich.

[21] Appl. No.: 384,509

[22] Filed: Feb. 6, 1995

[51] Int. Cl.$^6$ ....................................................... B60T 8/32
[52] U.S. Cl. ........................... 303/149; 303/148; 303/186
[58] Field of Search .................................. 303/148, 149, 303/186, 169

[56] References Cited

U.S. PATENT DOCUMENTS

| | | | |
|---|---|---|---|
| 4,313,166 | 1/1982 | Rode et al. | 303/149 |
| 4,349,876 | 9/1982 | Lindemann | 303/149 |
| 4,489,382 | 12/1984 | Jonner et al. | 303/149 |
| 5,286,098 | 2/1994 | Okuba | 303/148 |
| 5,419,623 | 5/1995 | Weber | 303/149 |

*Primary Examiner*—Matthew C. Graham
*Attorney, Agent, or Firm*—Brooks & Kushman P.C.

[57] ABSTRACT

A method and system for modifying anti-lock brake control to a vehicle braking on a split mu surface. Each of the wheel speeds are sensed and compared to a wheel speed reference. If the speed of only one of the front wheels departs from the wheel speed reference in excess of a predetermined slip threshold, a split mu control is activated. Upon detecting a departure of the high mu wheel, a first pressure control profile is applied to the low mu wheel, while a second control pressure profile different from the first pressure control profile is applied to the high mu wheel. Once the vehicle has transitioned from braking on a split mu surface to braking on a homogeneous mu surface, normal ABS control pressure is applied to the wheels.

23 Claims, 7 Drawing Sheets

METHOD AND SYSTEM FOR SPLIT MU CONTROL FOR ANTI-LOCK BRAKE SYSTEMS

TECHNICAL FIELD

This invention relates to anti-lock brake systems and, more particularly, to the control employed by anti-lock brake systems for braking on surfaces with varying coefficients of friction.

BACKGROUND ART

When the brakes are applied on a vehicle traveling at a given velocity, braking torques are generated at each of the brake wheels. The braking torque causes a retarding or braking force to be generated at the interface between the tire and the surface. The braking forces generated at the wheels then cause a decrease in the vehicle velocity.

Ideally, the braking forces at the wheels increase proportionately as the driver increases the force on the brake peddle. Unfortunately, this is not always the case in braking procedures. As the braking torque, and hence the braking force at the wheel, is increased, the rotational speed of the braked wheels becomes less than the speed of the vehicle. When the rotational speed of the wheel is less than the vehicle speed, "slippage" is said to occur between the tire and the surface. With further increase in brake pressure, the slippage between the tire and the surface increases until lockup and skidding of the wheel occurs. In most cases, lockup causes a reduction in braking force and increase in stopping distance. Lockup also causes a degradation in directional control due to a reduction in the lateral forces at the wheels.

Both of these problems associated with lockup were addressed with the advent of anti-lock brake systems (ABS). The basic anti-lock brake system monitors the speed at each of the wheels, decides whether the wheel is excessively slipping based on these speed measurements, and modulates the braking pressure accordingly to avoid lockup. The ABS aids in retaining vehicle stability and steerability while providing shorter stopping distances.

One method by which a state of excessive slippage is identified in the ABS includes comparing the speed of each wheel to a reference speed. The reference speed is an estimate of the true vehicle speed based on current and previous values of the individual wheel speed. If the speed of a wheel is significantly less than the reference speed, then the wheel is deemed by the ABS to be excessively slipping. The ABS then reduces the pressure actuating the brake in order to reduce brake torque. The reduction of brake torque allows the friction force at the surface to accelerate the wheels, thereby causing a reduction of the slip in the wheels.

After a period of constant braking pressure following the pressure reduction, the pressure actuating the brake is increased until excessive wheel slip occurs again. The cycle of decreasing the pressure, maintaining constant brake pressure, then increasing brake pressure is repeated until the anti-lock event ends. The parameters which define the specifics of this cycle depend on both the vehicle and the surface conditions.

For the present invention, the braking of a vehicle on a surface with varying coefficient of friction is considered. The coefficient of friction, mu, of a surface is defined as the ratio of the braking force generated at the interface between the tire and the surface to the normal force between the tire and the surface.

Three classes of surfaces can be defined qualitatively in terms of mu: high mu, low mu, and split mu. A high mu surface is one which produces relatively good braking ability. Dry asphalt is an example of a high mu surface. A low mu surface is characterized by its resulting in poor braking ability. An example of a low mu surface is a road covered with snow or ice. A split mu surface is encountered when a vehicle has some of its tires on a low mu surface and the other tires on a high mu surface. An example of a split mu surface is a road with snow or ice on one side of the vehicle and dry asphalt on the other side of the vehicle.

An example of a vehicle braking on a split mu surface is one in which one side of the vehicle is braking on an asphalt (high mu) surface, while the other side of the vehicle is braking on ice (low mu). The difference in braking torque from side to side induces a yaw moment which may be sufficient to cause vehicle instability and loss of control. The driver is then required to provide corrective steering measures to maintain the intended direction of the vehicle.

Known prior art systems typically estimate the mu of a surface based on the vehicle deceleration. Therefore, on a split mu surface, the estimated mu is an average of a high mu surface and a low mu surface. As a result, the mu is underestimated for the wheel braking on the high mu surface, while it is overestimated for the wheel braking on the low mu surface. It is common in the art to use the estimate of the surface mu to influence the pressure apply control to the brakes of the wheels. By underestimating the mu for the wheel braking on the high mu surface, insufficient brake pressure is initially applied to the wheel resulting in under-utilization of the surface adhesion. The overestimation of the mu for the wheel braking on the low mu surface results in too much pressure being applied to the low mu wheel; thereby forcing instability of the wheel.

The need exists within an anti-lock brake system for reducing the instability of a vehicle braking on a split mu surface due to an incorrect estimate of mu.

DISCLOSURE OF THE INVENTION

It is thus a general object of the present invention to provide a method and system for optimizing stopping distance when a vehicle is braking on a split mu surface.

It is another object of the present invention to provide a method and system for minimizing yaw and thus providing good vehicle stability when a vehicle is braking on a split mu surface.

It is yet another object of the present invention to provide a method and system for detecting a split mu surface during an anti-lock braking event and controlling the anti-lock brake system accordingly.

In carrying out the above objects and other objects, features and advantages of the present invention, a method is provided for modifying an anti-lock brake control of a vehicle braking on a split mu surface during an anti-lock braking event. A speed of each of the wheels is sensed. A braking event on a split mu surface is determined based on a relative speed of each of the front wheels. The speed of each of the wheels is compared to a wheel-specific speed reference. A departure between the wheel speed reference and the speed of only one of the front wheels indicates the vehicle is braking on a split mu surface. The anti-lock brake control is then modified when the split mu surface is detected. The brake pressure is applied to the front wheel braking on the lower mu surface utilizing a first control pressure profile. The brake pressure is applied to the front wheel braking on the higher mu surface utilizing a second control pressure profile which differs from the first control pressure profile.

The method further includes determining when the vehicle is no longer braking on a split mu surface and, in response thereto, controlling the brake pressure applied to each of the front wheels utilizing the normal anti-lock brake control for each of the front wheels.

In carrying out the above objects and other objects, features and advantages of the present invention, a system is also provided for carrying out steps of the above-described method.

The above objects, and other objects, features and advantages of the present invention, as well as others, are readily apparent from the following detailed description of the best mode for carrying out the invention when taken in connection with the accompanying drawings.

BRIEF DESCRIPTION OF THE DRAWINGS

FIGS. 4A, 4B, 4C, and 4D are block flow diagrams illustrating the method of the present invention.

BEST MODE FOR CARRYING OUT THE INVENTION

Figure 1:
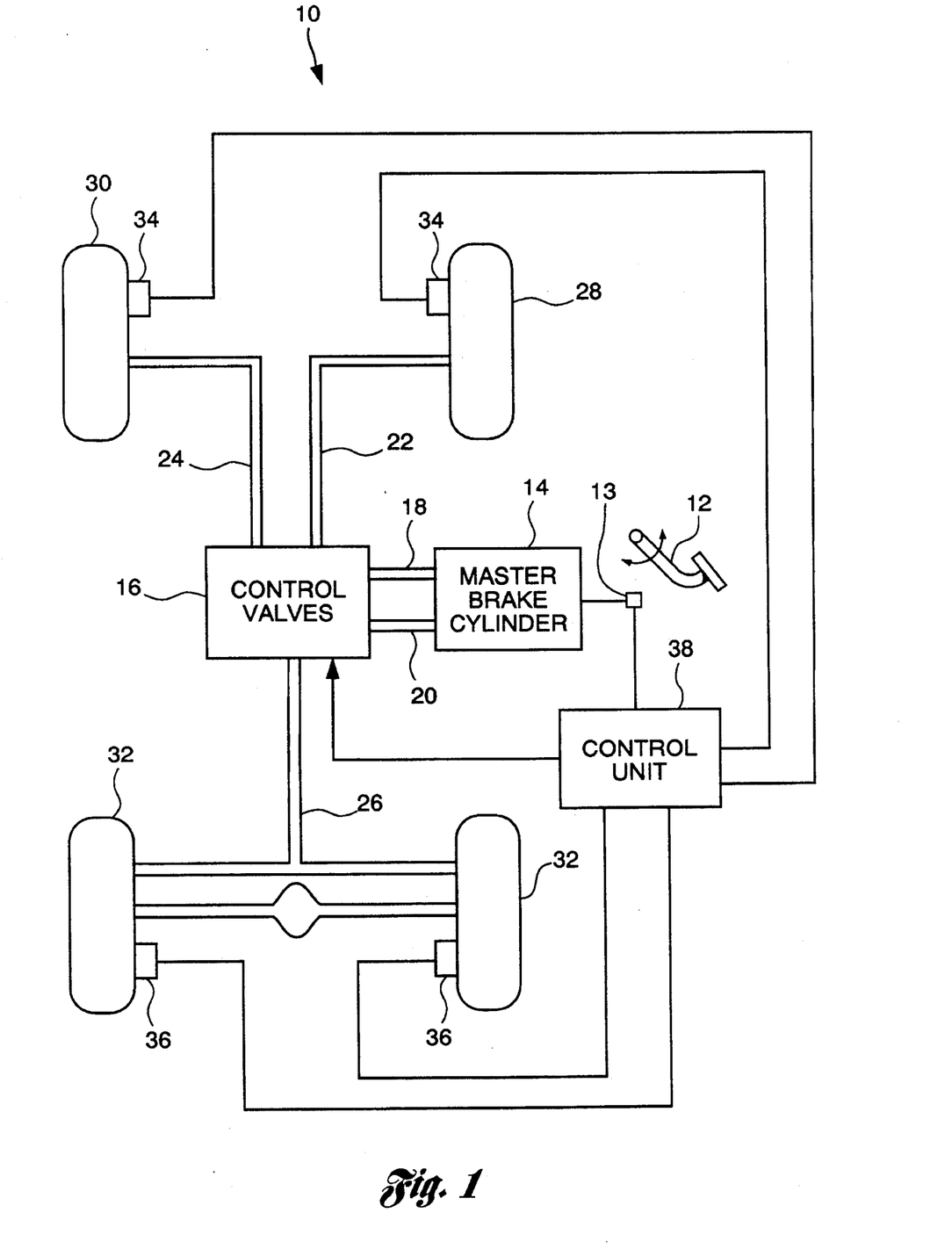
FIG. 1 is a schematic diagram of a vehicle and an interconnected system of the present invention in a vehicle ABS.

Referring now to FIG. 1, a schematic diagram of a motor vehicle in the system of the present invention is shown, denoted generally by reference numeral 10, in conjunction with an ordinary passenger vehicle hydraulic brake system including an ABS brake system. The hydraulic brake system includes a brake pedal 12, a brake switch 13, a brake master cylinder 14, control valves 16, brake fluid conduits 18, 20, 22, 24 and 26, as well as a right front wheel 28 and a left front wheel 30, and a pair of rear wheels 32.

The system 10 of the present invention includes a pair of vehicle wheel speed sensors 34 for measuring the speed of each of the front wheels 28 and 30, and a pair of vehicle wheel speed sensors 36 for measuring the speed of each of the rear wheels 32. The system 10 further comprises an anti-lock brake system control unit 38. Each of the wheel sensors 34 and 36 are operatively connected to the control unit 38, which is itself operatively connected to the anti-lock brake system control valve 16. Such operative connections are preferably electrical, but may also be other types of connections, such as fiber optics.

As is well known in the art, each of the wheel speed sensors 34 and 36 may comprise a stationary variable reluctance sensor (not shown) positioned adjacent a toothed wheel (not shown) which rotates with its respective vehicle wheels 28, 30, 32. The variable reluctance sensors each generate a pulse signal whose frequency varies directly with the speed of the respective vehicle wheels 28, 30, 32. Other well known speed sensor configurations may also be employed.

The control unit 38 takes the form of a commercially available microprocessor. Once programmed, the microprocessor control unit 38 functions as a control means for setting a slip threshold and a deceleration threshold for activating the ABS. The control unit 38 also functions as a control means for determining if the vehicle is braking on a split mu surface and applying brake pressure to each of the front wheels accordingly.

Figure 2A:
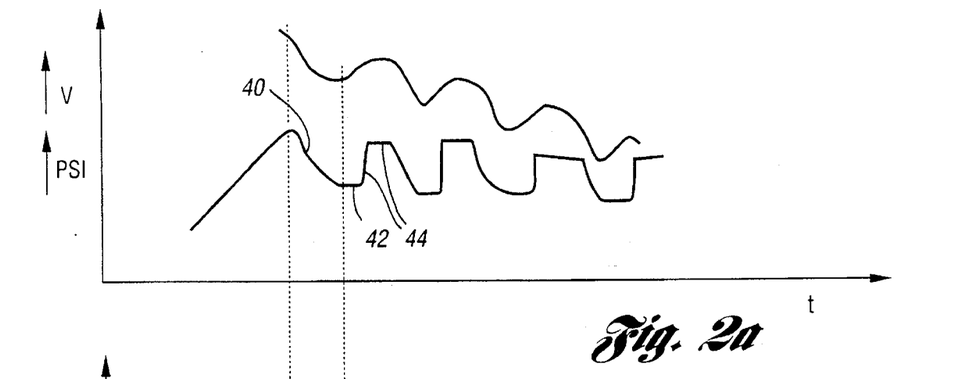
FIGS. 2A and 2B illustrate an example of a typical brake pressure cycling during an ABS event on a split mu surface.
Figure 2B:
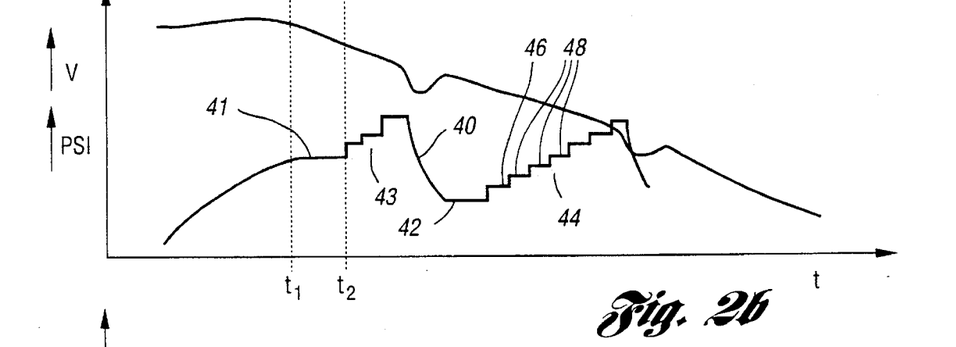

Referring now to FIGS. 2A and 2B there is illustrated an example of a brake pressure cycling during an ABS event occurring on a split mu surface. A cycle consists of: a dump mode 40 where the brake pressure is decreasing with time; a hold mode 42 where the brake pressure is maintained; and an apply mode 44 where the brake pressure is increasing with time. The cycle for the low mu wheel is formed as follows: When excessive slip, which is subsequently referred to as "wheel departure," occurs in only one of the front wheels, the ABS initiates the dump mode 40 on the low mu wheel as indicated at time $t_1$. Pressure is reduced in the brake, thus reducing the slip in the wheel. The brake pressure is then held constant in the hold mode 42, allowing the low mu wheel to accelerate and approach the speed of the vehicle. The apply mode 44 then increases the brake pressure in order to continue retarding the motion of the vehicle. If the apply mode 44 causes excessive slip in the wheel, then the cycle repeats.

The cycle for the high mu wheel is formed as follows: Upon detecting the initial departure experienced by the low mu wheel at time $t_1$, the ABS initiates a pre-split mu hold mode 41. When the low mu wheel begins accelerating out of the initial departure, time $t_2$, a pulse-up mode 43 is initiated. Generally, the pulse-up mode 43 includes a fixed pulse width and spacing in order to provide a constant rate of pressure increase until an initial departure is generated on the high mu wheel. Upon detecting the initial departure of the high mu wheel, the ABS initiates the dump mode 40, followed by the hold mode 42 and the apply mode 44.

The apply mode 44 is a pressure-build phase consisting of at least one primary apply pulse 46 and a plurality of secondary apply pulses 48. Both the primary apply pulse 46 and the secondary apply pulse 48 are based on a mu estimate. The mu of a road surface is typically estimated based upon vehicle deceleration, i.e., mu is proportional to vehicle deceleration. Therefore, on a split mu surface, the mu is an average mu estimated between the high mu wheel and the low mu wheel. As a result, the mu is underestimated for the wheel braking on the high mu surface, and it is overestimated for the wheel braking on the low mu surface. To prevent lockup on a low mu surface, a small pressure range is used. However; the effective pressure range for a vehicle braking on a high mu surface can be as much as an order of magnitude greater than the low mu pressure range. Consequently, when the vehicle is braking on a split mu surface, the low mu wheel can cycle rapidly due to a mu estimation that is greater than the effective mu. This is shown in FIG. 2A. Alternatively, the high mu wheel can cycle for a longer period than necessary, as shown in FIG. 2B.

Figure 3A:
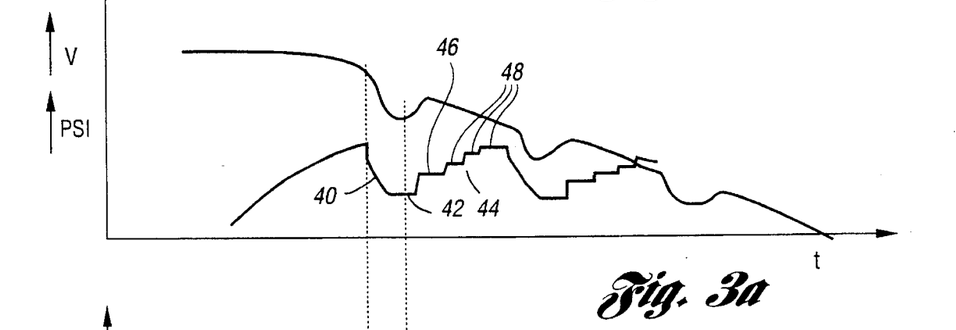
FIGS. 3A and 3B illustrate an example of a brake pressure cycling during an ABS event on a split mu surface utilizing the method of the present invention.
Figure 3B:
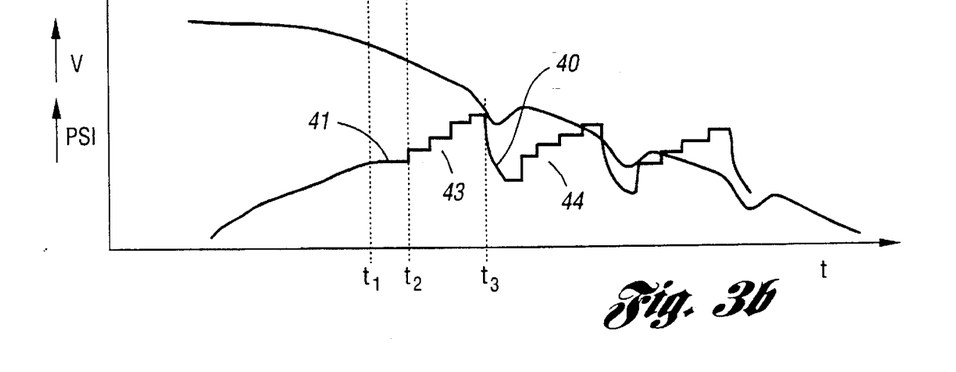

Referring now to FIGS. 3A and 3B, there is shown an example of a brake pressure cycling during an ABS event on a split mu surface using the method of the present invention. The mu estimate is biased when determining the apply mode 44 according to the surface mu on which the wheel is braking. FIG. 3A illustrates that the primary apply pulse 46 is keeping with the mu of the surface, gradually forcing a departure. The pressure applied to the high mu wheel, FIG. 3B, is also optimized.

Referring now to FIGS. 4A through 4D, there are shown block flow diagrams of the method of the present invention for controlling the ABS system of a vehicle braking on a split mu surface. The method of the present invention is performed for each wheel of the vehicle and then continues again, repeating the cycle.

Figure 4A:
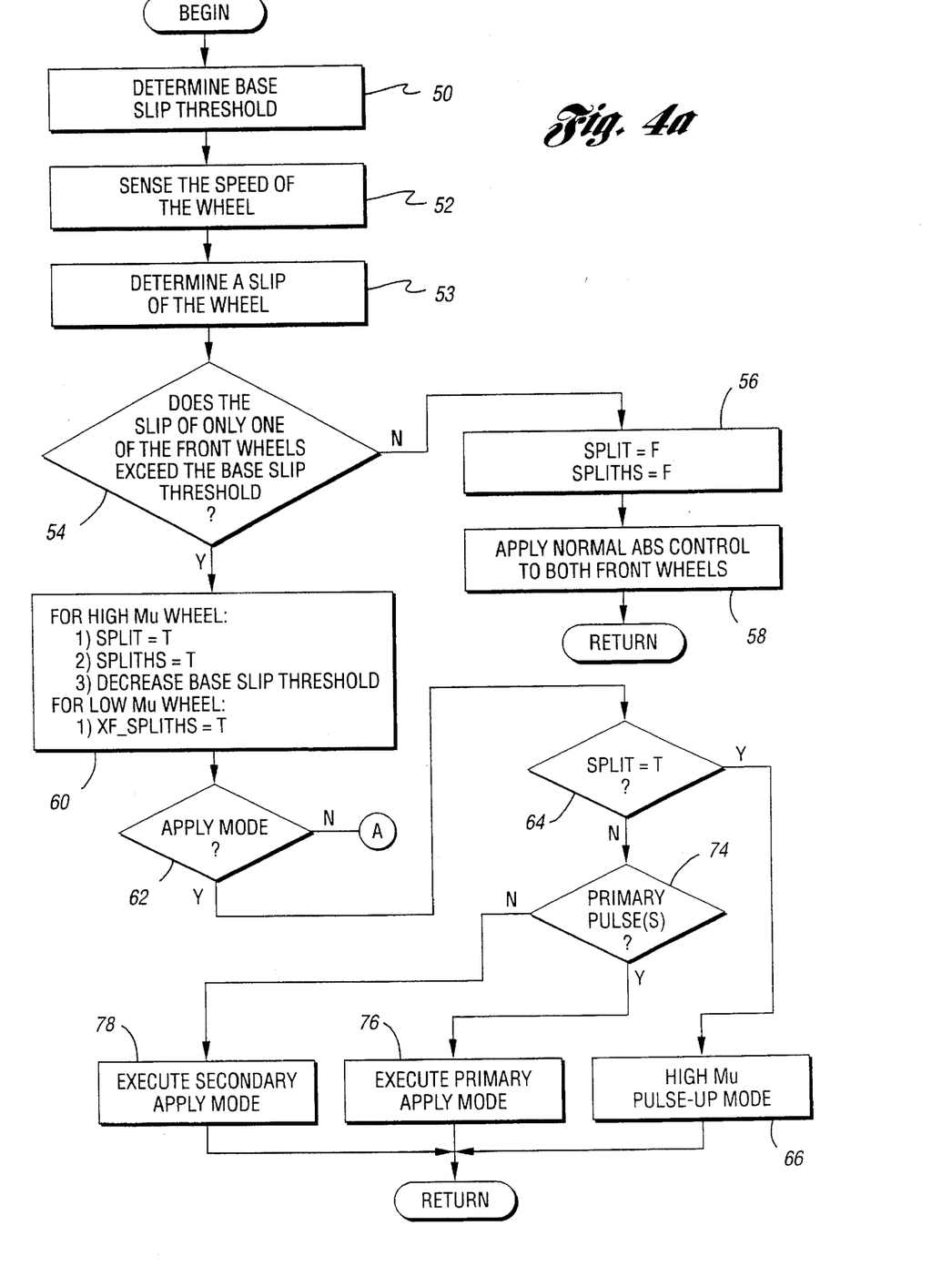

The method includes the initial step of determining a base slip threshold for the wheel as indicated at block 50. The method then continues with the step of sensing the speed of the wheel, as shown by block 52. A wheel slip is determined, as shown by block 53, based on the wheel speed and a wheel speed reference.

At block 54, after the method has already been performed for one of the front wheels, the slip of each of the front wheels is compared to each other to determine if the slip of only one of the front wheels is exceeding its respective base slip threshold. If block 54 is false at the onset of an ABS event, the vehicle is not braking on a split mu surface, and the split, "SPLIT", flag and the split history, "SPLITHS", flag are both set to false, as indicated at block 56. The "SPLITHS" flag is a flag which indicates there has been a history of split mu control. The "SPLIT" flag is a real time flag that indicates split mu control has been initiated upon detecting a slip of only one of the front wheels has exceeded a base slip threshold. Normal ABS control is applied to the wheels, as indicated at block 58.

If block 54 is true, the vehicle is determined to be braking on a split mu surface and split mu control is entered at time $t_1$. As indicated at block 60, the "SPLIT" flag and the "SPLITHS" flag are both set to true if the method is being run for the high mu wheel. The high mu wheel is the wheel in which the speed has not departed from the wheel speed reference in excess of the base slip threshold. If the method is being performed for the low mu wheel, an "XF_SPLITHS" is set to true. Although in the preferred embodiment the "SPLIT" and "SPLITHS" flags are set for the high mu wheel, these flags could be alternatively set for the low mu wheel.

· Also, once it is determined that the vehicle is braking on a split mu surface, the base slip threshold is reduced for the high mu wheel, as shown by block 60. By reducing the slip threshold, the point at which pressure is reduced due to a wheel becoming unstable is reached sooner. Therefore, the ABS is more sensitive to instability, and pressure control is optimized.

Upon entering the split mu control, the ABS control is modified after an initial departure has occurred on the high mu wheel so that a first pressure control profile is applied to the low mu wheel and a second pressure control profile, different from the first pressure control profile, is applied to the high mu wheel. Both the first pressure control profile and the second pressure control profile include at least one primary apply pulse and a plurality of secondary apply pulses.

Next, the method continues with the step of determining if pressure needs to be applied, as shown by block 62. If the ABS is not in the pulse-up mode 43 or the apply mode 44, the ABS is either in the dump mode 40 or the hold mode 42. The action taken by the method of the present invention when block 62 is false will be described in greater detail below.

If block 62 is true, the "SPLIT" flag is checked, as shown by block 64. If the "SPLIT" flag is true, the method proceeds to the high mu pulse-up mode 43 as shown by block 66. The high mu pulse-up mode is a fixed apply rate used to force a departure on the apparent high mu wheel. Control is then returned to the main program.

Figure 4B:
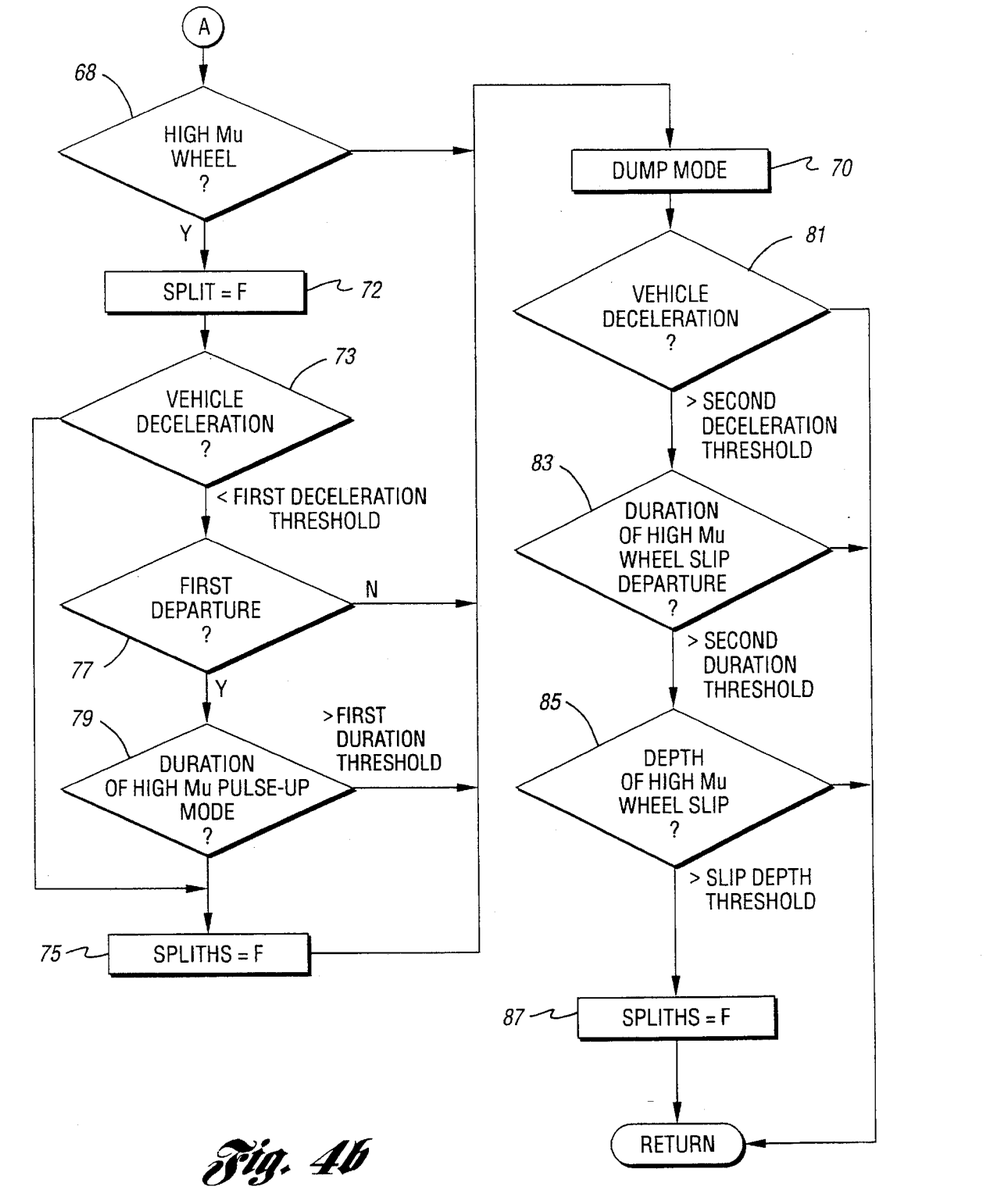

Upon repeating the steps of the method of the present invention and determining the ABS is no longer in the pulse-up mode 43 or the apply mode 44, the method continues with the step of determining whether the current wheel is the high mu wheel as indicated at block 68 in FIG. 4B. If block 68 is false, the method continues to proceed with the dump mode 40, as indicated by block 70. If block 68 is true, the "SPLIT" flag is cleared and set to false at time $t_3$, as indicated at block 72. Therefore, the high mu pulse-up mode 43, as shown at block 66, occurs only during the initial phase of the method.

After the "SPLIT" flag is cleared, the method continues to determine whether the split mu control was falsely activated. A false split mu condition is acknowledged by evaluating the pressure-build phase of the high mu wheel pulse-up mode 43. First, the vehicle deceleration is compared to a first predetermined deceleration threshold, as shown by block 73. If the vehicle deceleration exceeds the first predetermined deceleration threshold, the "SPLITHS" flag is cleared, as shown by block 75.

If the vehicle deceleration does not exceed the first predetermined deceleration threshold, the method continues to determine whether the departure of the high mu wheel is the first departure, as shown by block 77. If the high mu wheel departure is not the first departure, the split mu control was not falsely activated and the method continues to proceed to the dump mode 40, as shown by block 70.

If the high mu wheel departure is the first departure, the duration of the pulse-up mode 43 is compared to a first predetermined duration threshold, as shown by block 79. If the duration of the pulse-up mode 43 exceeds the first predetermined duration threshold, the split mu control was not falsely activated and the method continues to the dump mode 40, as shown by block 70.

However, if the duration of the pulse-up mode 43 does not exceed the first predetermined duration threshold, the split mu control was falsely activated and the "SPLITHS" flag is cleared, as shown by block 75. The method continues to proceed to the dump mode 40, as shown by block 70.

Block 70 indicates that the method is either being performed for the low mu wheel or the high mu wheel has departed. Next, the method continues with the step of determining whether the vehicle has transitioned from braking on a split mu surface to braking on a low mu surface. First, the vehicle deceleration is compared to second predetermined deceleration threshold, as shown by block 81. If the vehicle deceleration does not exceed the second predetermined deceleration threshold, the vehicle has not transitioned from the split mu surface and control is returned to the main program.

If the vehicle deceleration exceeds the second predetermined deceleration threshold, the method continues with the step of determining if the duration of the high mu wheel slip exceeds a second predetermined duration threshold, as shown by block 83. If the duration of the slip does not exceed the second predetermined deceleration threshold, control is returned to the main program.

If the duration of the slip of the high mu wheel exceeds the second predetermined duration threshold, the method continues with the step of determining whether the depth of the slip exceeds a predetermined slip threshold, preferably 50% of the vehicle speed, as shown by block 85. If the depth of the slip does not exceed the predetermined slip threshold, the vehicle is still braking on a split mu surface and control is returned to the main program.

However, if the depth of the slip exceeds the predetermined slip threshold, the vehicle has transitioned from the split mu surface to a homogeneous low mu surface and the "SPLITHS" flag is cleared, as shown by block 87. Control is then returned to the main program.

Returning to block 64, if the "SPLIT" flag is false, the ABS is either pulsing up the high mu wheel or the low mu wheel. The method then continues with the step of determining if the pulse is the primary apply pulse 46, as shown at block 74.

If block 74 is true, the method continues with the step of executing the primary apply mode, as shown by block 76. The primary apply mode is illustrated in greater detail in FIG. 4C.

If block 74 is false, the method continues with the step of executing the secondary apply mode, as indicated by block 78. The secondary apply mode is illustrated in further detail in FIG. 4D. The primary apply mode 76 and the secondary apply mode 78 together form a pressure control profile utilized to control pressure applied to the brakes of the wheels.

Blocks 62, 64, 74, 76 and 78 are continued until the magnitude of a departure of the wheel speed from a wheel-specific speed reference exceeds the slip threshold. Once a departure is forced, block 62 will be false, and the ABS will go into a dump mode 40, as indicated at block 70.

Figure 4C:
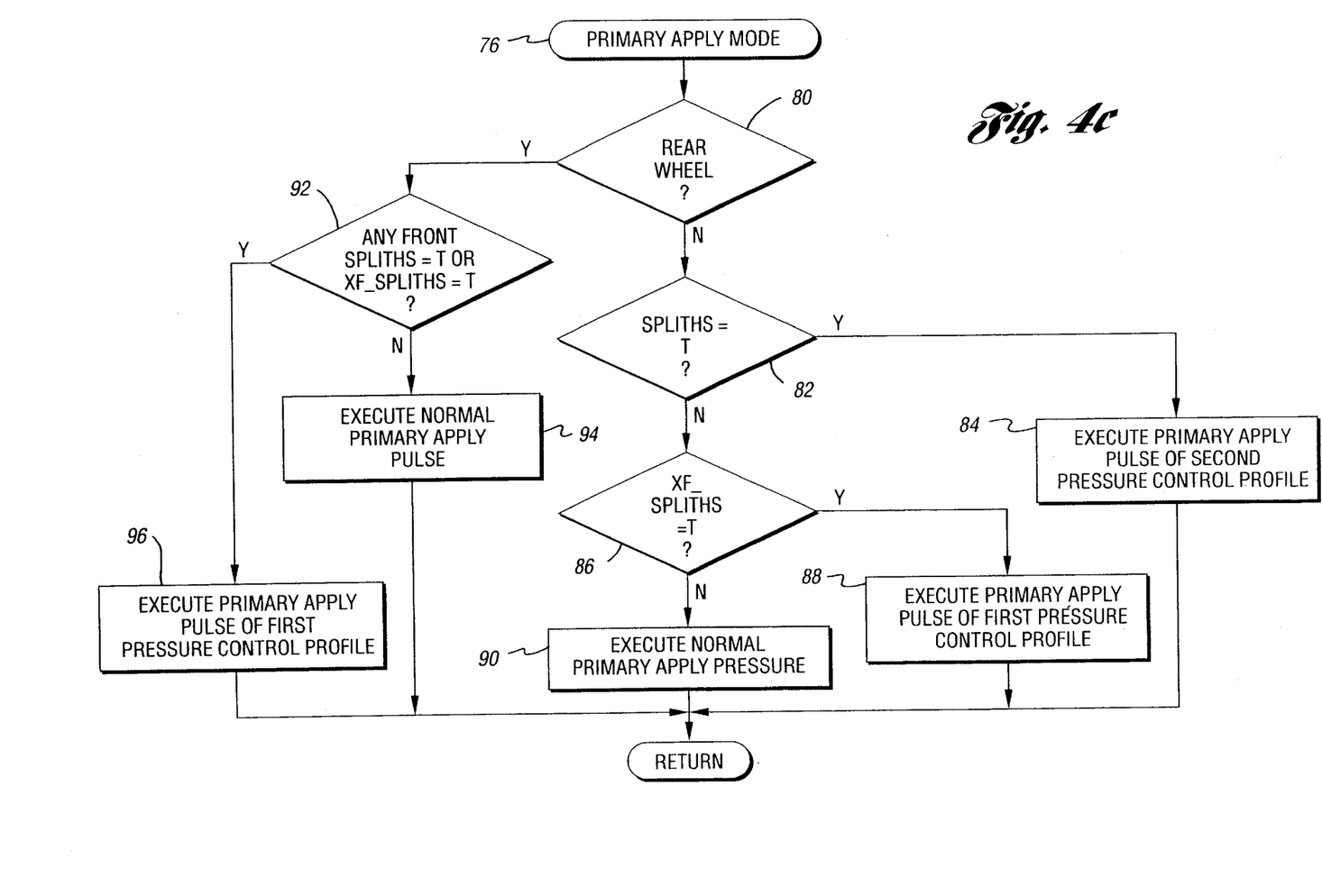

Turning now to FIG. 4C, there is shown a block diagram illustrating the general sequence of steps associated with the primary apply mode 76. The function of the primary apply pulse 46 is to build pressure as quickly as possible after the wheel has recovered from a departure without overshooting the maximum pressure the wheel can take. The primary apply pulse 46 includes a predetermined gain based on a dump time, the mu estimate, and a tuner which is an apply gain designed to force the cycle rate to a specified target period. The primary apply pulse 46 is also modified based on the mechanical hysteresis of the control valve 16.

The method continues with the step of determining if the rear wheel is the current wheel, as indicated at block 80. If block 80 is true, the method continues to control the brake pressure to the rear wheels as will be discussed in greater detail below.

If block 80 is false, the method continues to determine if the "SPLITHS" flag is true, as indicated at block 82. If the "SPLITHS" flag is true, then there has been a history of braking on a split mu surface and the method is being run for the high mu wheel. If block 82 is true, the method continues with the step of executing the primary apply pulse 46 of the second pressure control profile, as shown by block 84. The gain of the primary apply pulse 46 of the second pressure control profile is compensated for the underestimation of the mu estimate. Therefore, the gain of the primary apply pulse 46 for the high mu wheel is increased. The gain may be increased either by a fixed amount or by an amount proportional to the vehicle deceleration.

If block 82 is false, then either the "SPLITHS" flag has been cleared for the high mu wheel indicating the split mu control was falsely activated, or that the method is being performed for the low mu wheel, or there has been a transition from a split mu surface to a homogeneous mu surface.

Next, the method continues with the step of determining if the opposite front split history "XF_SPLITHS" flag is set to true, as indicated at block 86. If the "XF_SPLITHS" flag is set to true, then the vehicle is braking on a split mu surface and the routine is being run for the front low mu wheel. Therefore, the method executes the primary apply pulse 46 of the first pressure control profile, as indicated at block 88. The primary apply pulse 46 is compensated for the overestimated mu. Therefore, the gain of the primary apply pulse 46 for the low mu wheel is decreased. The gain may be decreased either by a fixed amount or by an amount proportional to the vehicle deceleration.

If both the "SPLITHS" flag is false and the "XF_SPLITHS" flag is false, the method continues to execute the normal primary apply pulse to each of the front wheels, as indicated at block 90. The normal primary apply pulse 46 has a gain proportional to the estimated mu.

Returning to block 80, if the routine is being run for the rear wheels, the method continues to determine if any of the front wheels are braking on a split mu surface as indicated at block 92. If block 92 is false, the method continues to execute the normal primary apply pulse on the rear wheel, as indicated at block 94.

If the front wheels are braking on a split mu surface, the method continues with the step of executing the primary apply pulse of the first pressure control profile on the rear wheels, as shown by block 96. In the present invention, the rear wheels are controlled by a single channel. Therefore, brake pressure is applied to the rear wheels according to the low mu wheel slip characteristics. The present invention also applies, however, if the rear wheels are controlled by separate channels. In this case, pressure would be applied to the rear wheels in the same manner as the pressure is applied to the front wheels.

Turning now to FIG. 4D, there is shown a flow diagram illustrating the general sequence of steps necessary to execute the secondary apply mode 78. First, the method determines if the method is being performed for the rear wheels as shown by block 98. If block 98 is true, a base gain of the secondary apply pulses 48 is set for the rear wheels, as indicated at block 100. The gain represents the slope of the pressure-build phase for the rear wheels.

If block 98 is false, the method continues to set a base gain of the secondary apply pulses 48 for the front wheel, as indicated at block 102. This gain also represents the slope of the pressure-build phase of the front wheel.

The method continues with the step of determining if the vehicle is braking on a split mu surface, as indicated at block 104. If block 104 is true, the split mu control bypasses a cycle-long control. The cycle-long control is initiated after a target cycle time for the wheel has been exceeded since the vehicle may be underbraked.

If block 104 is false, the method determines if the cycle-long control is to be executed, as indicated at block 106. If the cycle target cycle time has been exceeded, the method continues with the step of determining whether the vehicle has transitioned from braking on a split mu road surface to braking on a high mu road surface.

The transition from a split mu surface to a high mu surface can be detected by monitoring the duration of the pressure-build phase of the low mu wheel. If the duration of the pressure-build phase of the low mu wheel, block 107, exceeds a third predetermined duration threshold, as indicated by block 106, the "SPLITHS" flag is cleared, as shown by block 109, indicating that the vehicle has transitioned from braking on a split mu surface to braking on a high mu surface.

The method continues to proceed to a progressive apply mode, as shown at block 108. In this mode, the secondary apply pulses 48 are progressively increased since the vehicle is assumed to be under-braked as indicated by the extended apply time. A split mu condition bypasses this mode for the high mu wheel since a progressive application of brake pressure would add roughness in the pressure control which can induce vehicle yaw and steering wheel feedback.

If the method is being performed for the high mu wheel, block 110 is true and the method continues to execute the secondary apply pulses 48 of the second pressure control profile on the high mu wheel, as indicated at block 112. The secondary apply pulses 48 each have an increased gain compensated for the underestimated mu.

If the method is not being performed for the front high mu wheel, the method continues to determine if the "SPLITHS" flag has been cleared, or if the method is being performed for the low mu wheel, as indicated at block 114. If block 114 is true, the method continues to execute the secondary apply pulses 48 of the first pressure control profile on the low mu wheel, as indicated at block 116. The secondary apply pulses 48 each have a decreased gain due to the overestimated mu.

If block 114 is false, a split mu condition is not detected and the method continues to apply the normal secondary apply pulses 48, as indicated at block 118. Control is then returned to the main program.

Figure 5:
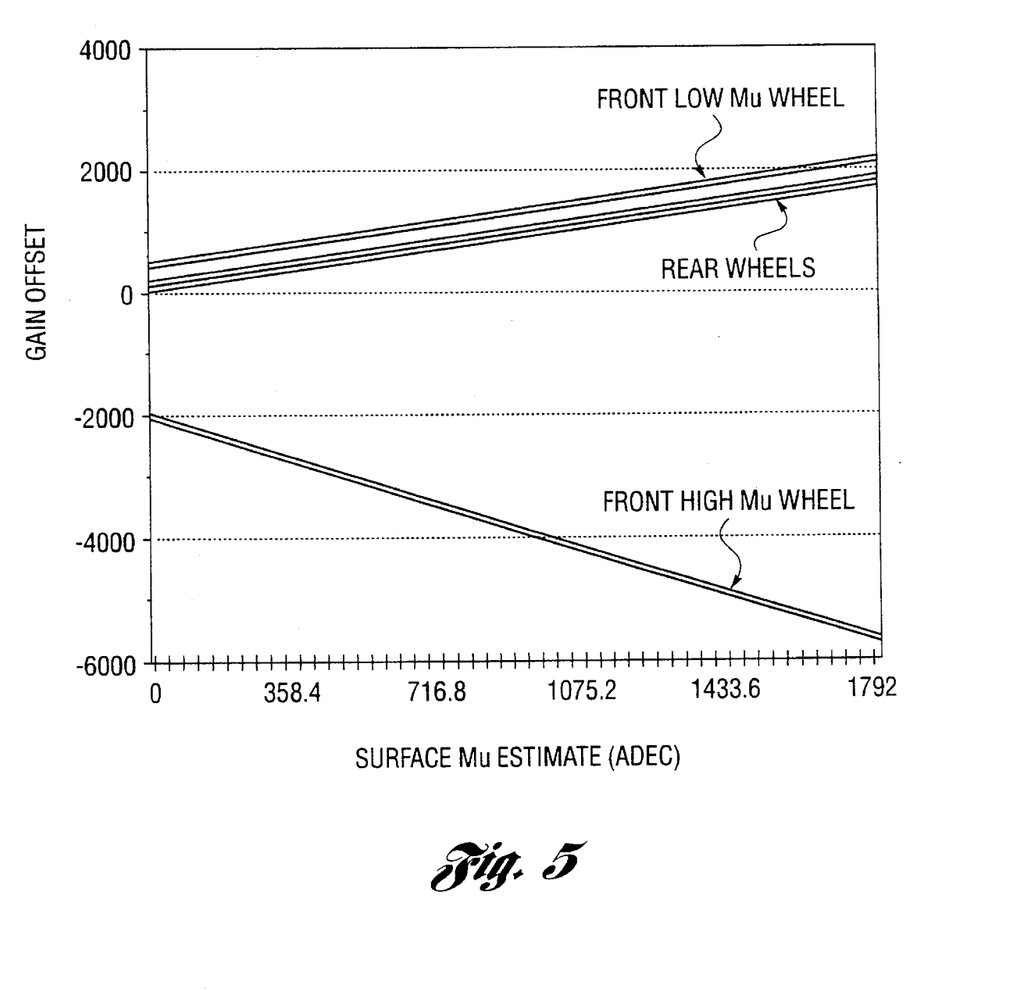
FIG. 5 is a graph of various primary pulse width gain offsets for the vehicle braking on a split mu surface.

Turning now to FIG. 5, there is a graph illustrating the mu-based modification of the primary apply pulses 46. The pulse width gain of the primary apply pulses 46 are proportional to a constant multiplied by the mu estimate less an offset, PW≈ K*(mu-offset). For the high mu wheel, the offset decreases as the surface mu increases, thereby increasing the gain of the primary apply pulse 46 applied to the front high mu wheel.

On the other hand, the offset increases as the surface mu increases, thereby decreasing the gain of the primary apply pulse 46 for both the front low mu wheel and the rear wheels, as shown in FIG. 5. A similar mu-based modification can be performed for the secondary apply pulses 48.

While the best modes for carrying out the invention have been described in detail, those familiar with the art to which this invention relates will recognize various alternative designs and embodiments for practicing the invention as defined by the following claims.

What is claimed is:

1. In a vehicle having front first and second wheels, rear wheels, and corresponding brakes, and a hydraulic brake system for applying hydraulic brake pressure to the brakes during an anti-lock braking event wherein the brake pressure is applied to the brakes according to a predetermined pressure control profile having a predetermined gain, a method for controlling the hydraulic brake pressure applied to the brakes during the anti-lock braking event when the vehicle is braking on a split mu surface, the method comprising:

sensing a speed of each of the wheels to generate a speed signal for each of the wheels;

determining if the first wheel is braking on a low mu road surface and the second wheel is braking on a high mu road surface relative to the low mu road surface based on the speed signals;

detecting the anti-lock braking event based on the speed signals;

if the first wheel is braking on a low mu road surface and the second wheel is braking on a high mu road surface, modifying the predetermined gain to obtain a reduced gain and an increased gain, applying a first pressure control profile having the reduced gain to the brake of the first wheel and applying a second pressure control profile having the increased gain to the brake of the second wheel, the first pressure control profile differing from the second pressure control profile; and applying the first pressure control profile to each of the brakes of the rear wheels.

2. The method of claim 1 further comprising:

determining if the first wheel has transitioned from braking on the low mu road surface to braking on a high mu road surface while the second wheel continues braking on the high mu road surface; and if the first wheel has transitioned from braking on the low mu road surface to braking on a high mu road surface, applying a fourth predetermined pressure control profile to the brakes of both the first and second wheels.

3. The method of claim 2 wherein the first pressure control profile includes an apply mode, and wherein the step of determining if the first wheel has transitioned from braking on the low mu road surface comprises:

determining a duration of the apply mode of the first pressure control profile; and determining if the duration of the apply mode exceeds a predetermined apply duration threshold.

4. The method of claim 1 further comprising the step of determining a wheel slip based on the wheel speed and a wheel speed reference, and wherein the step of determining if the first wheel is braking on a low mu road surface includes the step of determining if only the slip of the first wheel exceeds a predetermined wheel slip threshold.

5. The method of claim 4 further comprising decreasing the predetermined wheel slip threshold for the first wheel.

6. The method of claim 1 wherein the gain is reduced by a fixed amount.

7. The method of claim 1 wherein the gain is reduced by an amount proportional to a deceleration of the vehicle.

8. The method of claim 1 wherein the gain is increased by a fixed amount.

9. The method of claim 1 wherein the gain is increased by an amount proportional to a deceleration of the vehicle.

10. The method of claim 1 wherein the step of detecting the anti-lock braking event comprises the step of determining if the speed of the second wheel departs from a wheel speed reference by a predetermined amount.

11. The method of claim 1 wherein the rear wheels include a first wheel and second wheel and wherein the step of applying the first pressure control profile to each of the brakes of the rear wheels further includes the step of: applying the first pressure control profile to the brake of the rear first wheel and applying the second pressure control profile to the brake of the rear second wheel.

12. The method of claim 1 further comprising:

determining whether the vehicle is no longer braking on a split mu road surface; and if the vehicle is no longer braking on the split mu road surface, applying a second predetermined pressure control profile to the brakes of both the first and second wheels.

13. The method of claim 12 wherein the second pressure control profile further includes an initial apply mode having a duration, and wherein the step of determining whether the vehicle is no longer braking on a split mu road surface comprises:

determining a vehicle speed based on the generated wheel speed signals;

determining a vehicle deceleration based on the generated wheel speed signals;

detecting an initial departure of the speed of the second wheel from a wheel speed reference;

determining if the vehicle deceleration does not exceed a first predetermined deceleration threshold; and determining if the duration of the initial apply mode does not exceed a first predetermined duration threshold.

14. The method of claim 12 wherein the step of determining whether the vehicle is no longer braking on a split mu road surface comprises:

determining a vehicle speed based on the generated wheel speed signals;

determining a departure of the speed of the first wheel from the vehicle speed, the departure having a duration and a depth; and determining if the duration of the departure does not exceed a third predetermined duration threshold or the depth of the departure does not exceed a third predetermined depth threshold.

15. The method of claim 1 further comprising:

determining if the first wheel continues braking on a low mu road surface while the second wheel has transitioned from braking on a high mu road surface to braking on a low mu road surface; and if the second wheel has transitioned from braking on the high mu road surface to braking on a low mu road surface, applying a third predetermined pressure control profile to the brakes of both the first and second wheels.

16. The method of claim 15 wherein the step of determining if the second wheel has transitioned from braking on the high mu road surface comprises:

determining a vehicle speed based on the generated wheel speed signals;

determining a vehicle deceleration based on the generated wheel speed signals;

determining a departure of the speed of the second wheel from a wheel speed reference, the departure having a duration and a depth;

determining if the vehicle deceleration exceeds a second predetermined deceleration threshold;

determining if the duration of the departure exceeds a second predetermined duration threshold; and determining if the depth of the departure exceeds a predetermined slip depth threshold.

17. In a vehicle having front first and second wheels and rear wheels and corresponding brakes, and a hydraulic brake system for applying hydraulic brake pressure to the brakes during an anti-lock braking event wherein the brake pressure is applied to the brakes according to a predetermined pressure control profile having a predetermined gain, a system for controlling the hydraulic brake pressure applied to the brakes during the anti-lock braking event when the vehicle is braking on a split mu surface, the system comprising:

a sensor for sensing a speed of each of the wheels to generate a speed signal for each of the wheels;

a control unit coupled to the sensor for:

determining if the first wheel is braking on a low mu road surface and the second wheel is braking on a high mu road surface relative to the low mu road surface;

detecting the anti-lock braking event based on the speed signals; and if the first wheel is braking on a low mu road surface and the second wheel is braking on a high mu road surface, modifying the predetermined gain to obtain a reduced gain and an increased gain, generating a first pressure control profile signal having the reduced gain and generating a second pressure control profile signal having the increased gain, the first pressure control profile signal differing from the second pressure control profile signal; and a control valve coupled to the control unit for applying brake pressure to the first wheel based on the first pressure control profile signal, applying brake pressure to the second wheel based on the second pressure control profile signal, and for applying the first pressure control profile signal to each of the brakes of the rear wheels.

18. The system as recited in claim 17 wherein the gain is reduced by a fixed amount.

19. The system as recited in claim 17 wherein the gain is reduced by an amount proportional to a deceleration of the vehicle.

20. The system as recited in claim 17 wherein the gain is increased by a fixed amount.

21. The system as recited in claim 17 wherein the gain is increased by an amount proportional to a deceleration of the vehicle.

22. The system as recited in claim 17 wherein the rear wheels include a first wheel and a second wheel and wherein the control valve further for applying brake pressure to the brake of the rear first wheel based on the first pressure control profile signal and for applying brake pressure to the brake of the rear second wheel based on the second pressure control profile signal.

23. The system as recited in claim 17 wherein the control unit further for determining whether the vehicle is no longer braking on a split mu road surface and generating a second predetermined pressure control profile signal if the vehicle is no longer braking on the split mu road surface and wherein the control valve further for applying brake pressure to the brakes of the first and second wheels based on the second predetermined pressure control profile signal.

* * * * *